United States Patent
Christensen et al.

(10) Patent No.: US 6,592,799 B1
(45) Date of Patent: Jul. 15, 2003

(54) VIBRATION ASSISTED PROCESSING OF VISCOUS THERMOPLASTICS

(75) Inventors: Stephen Christensen, Issaquah, WA (US); Eric J. Stober, Enumclaw, WA (US)

(73) Assignee: The Boeing Company, Seattle, WA (US)

( * ) Notice: Subject to any disclaimer, the term of this patent is extended or adjusted under 35 U.S.C. 154(b) by 833 days.

(21) Appl. No.: 08/762,235

(22) Filed: Dec. 9, 1996

(51) Int. Cl.⁷ .............................. B06B 1/00; B29B 11/12
(52) U.S. Cl. .......................... 264/442; 264/69; 264/71; 264/72; 264/425; 264/443; 264/463; 264/101; 264/102
(58) Field of Search ............................ 264/69, 71, 72, 264/425, 443, 102, 442, 463, 101

(56) References Cited

U.S. PATENT DOCUMENTS

| | | | | |
|---|---|---|---|---|
| 1,562,520 A | * | 11/1925 | Ruppel | 264/72 |
| 2,626,430 A | | 1/1953 | Dawson | |
| 3,217,356 A | * | 11/1965 | Stutsman | 264/69 |
| 3,447,480 A | | 6/1969 | Bodine | |
| 3,447,587 A | | 6/1969 | Bodine | |
| 3,556,888 A | | 1/1971 | Goldsworthy | |
| 3,627,602 A | | 12/1971 | Van Dijk | |
| 3,839,521 A | * | 10/1974 | Robinson | 264/78 |
| 4,042,652 A | | 8/1977 | Feneberg | |
| 4,056,596 A | | 11/1977 | Pahl | |
| 4,062,913 A | * | 12/1977 | Miller et al. | 264/24 |
| 4,159,361 A | * | 6/1979 | Schupack | 264/69 |
| 4,288,398 A | | 9/1981 | Lemelson | |
| 4,388,129 A | | 6/1983 | Oizumi et al. | |
| 4,402,778 A | | 9/1983 | Goldsworthy | |
| 4,515,545 A | | 5/1985 | Hinrichs et al. | |
| 4,564,297 A | * | 1/1986 | Firth | 366/108 |
| 4,747,894 A | | 5/1988 | Johnston et al. | |
| 4,816,106 A | | 3/1989 | Turris et al. | |
| 4,917,741 A | | 4/1990 | Theis et al. | |
| 5,183,619 A | * | 2/1993 | Tolton | 264/102 |
| 5,236,646 A | * | 8/1993 | Cochran et al. | 264/102 |
| 5,248,467 A | * | 9/1993 | Cushman | 264/102 |
| 5,254,298 A | * | 10/1993 | Ibar | 264/69 |
| 5,261,993 A | * | 11/1993 | Dahlgren | 156/382 |
| 5,302,107 A | * | 4/1994 | Dahlgen | 425/388 |
| 5,304,339 A | * | 4/1994 | Le Comte | 264/102 |
| 5,328,656 A | * | 7/1994 | Thulin | 264/102 |
| 5,330,691 A | * | 7/1994 | Geeraert | 264/69 |
| 5,403,537 A | * | 4/1995 | Seal et al. | 264/102 |
| 5,500,164 A | * | 3/1996 | Livesay et al. | 264/102 |
| 5,527,175 A | * | 6/1996 | Face, Jr. et al. | 264/69 |

FOREIGN PATENT DOCUMENTS

| | | | | |
|---|---|---|---|---|
| DE | 000136809 A | * | 8/1979 | 264/443 |
| GB | 2 246 095 A | * | 1/1992 | 264/443 |
| JP | 54-34762 | | 3/1979 | |
| JP | 363 247013 A | * | 10/1988 | 264/443 |

* cited by examiner

Primary Examiner—Stephen J. Lechert, Jr.
(74) Attorney, Agent, or Firm—John C. Hammar

(57) ABSTRACT

Cure and consolidation of a viscous thermoplastic resin, especially one that softens and melts at a high temperature, is improved by assisting autoclave pressurized momentum transport for compaction of the composite using high frequency, low amplitude acoustic vibration within the resin. The vibration induces shear thinning in the resin which promotes resin flow, achieves filling or collapse of voids, and assists consolidation of the composite preform.

10 Claims, 2 Drawing Sheets

VIBRATION ASSISTED PROCESSING OF VISCOUS THERMOPLASTICS

TECHNICAL FIELD

The present invention relates to a method and associated tooling to assist flow, consolidation, and cure of a fiber-reinforced, viscous thermoplastic resin composite by inputting vibration energy at high frequency and low amplitude displacement to supplement conventional autoclave heating, especially for high melting, non-Newtonian, pseudoplastic resins.

BACKGROUND OF THE INVENTION

Aerospace thermoplastic composites are relatively difficult to process because the resins contain significant amounts of solvent and cure at relatively high temperatures often with a limited range of temperature between the boiling point of the solvent, melting point of the resin, and curing temperature of the resin. We call this temperature range the processing window with conventional autoclave processing where the prepreg laminate is enclosed within vacuum bags and heated within a pressurized oven, it is often difficult to obtain substantially fully consolidated products. Operating in the narrow processing window is difficult, but doing so is essential to evaporate the solvent, to melt the resin so that plies in the laminate will consolidate and flow, and to cure the resin by its chain extension condensation reaction. Augmenting the processing with ultrasonic vibration to supplement the conventional practice of pressing the melted material for momentum transport ("flow") should improve the products while reducing the cure cycle. Therefore, the process of the present invention saves time and reduces waste or rework. Since the resins cost over $100 per pound and the manufacturing process is relatively slow and labor intensive, the present process promises a significant economic benefit.

In U.S. Pat. No. 4,288,398, Lemelson described alternative methods for controlling the internal structure of molded or extruded plastics or metals. Lemelson suggested using ultrasound alone or in combination with other forms of energy to orient the grain or crystalline structure. Lemelson introduced ultrasound to the melted material during its consolidation to control the internal structure. The process of the present invention uses ultrasound to assist momentum transport after heating the resin to its softening or melting temperature and during the pressure application for resin flow phase of its consolidation.

Thermoplastic resins that cure to composites usable at high operating temperature generally require high processing temperatures. For a resin-fiber composite system capable of operating at 425° F. or higher, the resin must have a glass transition temperature ($T_g$) of 525° F. after equilibration with the operating environment and an "as processed" $T_g$ approaching 600° F. A resin with a high $T_g$ will also have a high melting ($T_m$) or softening ($T_s$) temperature. The temperature differential between the $T_g$ and the $T_s$ is established by the molecular weight distribution and usually is on the order of 200° F. In addition, the viscosity of such a high melting resin above the melt or softening temperature will likely be greater than $10^6$ Pa·sec. Therefore, consolidating acceptable quality laminates using these resins requires high pressures and temperatures.

To date, only small parts that will fit within the platens of a press could be fabricated using extremely high $T_g$ resins. Processing in this manner requires matched tooling and has been limited to high value parts such as engine components.

Attempts to consolidate large planform area parts (such as exterior skin panels for composite aircraft) in an autoclave have been unsuccessful. The laminates exhibited extensive porosity and suffered from microcracking because of the volatiles and by-product gases generated during the condensation reaction of the resin when it cured. High viscosity of these high melting resins inhibited momentum transport and resin flow during the pressurized portion of the autoclave cycle. While processing might be possible at even higher temperatures and pressures, conventional autoclaves are not designed for the increased pressures. Replacing conventional autoclaves to allow higher pressure operation is too expensive to justify using the high melting resins available today for today's applications.

SUMMARY OF THE INVENTION

In the present invention, piezoelectric transducers apply vibration at high frequency (in excess of $10^5$ Hz) and low displacement (i.e., $\leq 1\ \mu m$) to a prepregged part on a layup mandrel to advance the consolidation of composites containing high viscosity resins that have high melting temperatures, high glass transition temperatures, and exhibit pseudoplastic rheology. The resin flow is increased by subjecting the parts to be processed to high frequency vibration (high shear rates), which usually exceeds $10^6$ Hz. The vibration causes the melted resin to flow into voids in the part and incrementally heats the resin to assist in its consolidation. To avoid distortion of the individual fibers, yarns, or plies the displacement must be limited. If individual fibers translate relative to each other (i.e., move independently), then the displacement should not exceed 5–10 $\mu m$, which is comparable to the fiber diameter. If the yarns or individual plies vibrate together, then the displacement can be increased to 0.005–0.01 inches. The viscosity versus shearing rate behavior will be pseudoplastic i.e. shear thinning, to provide the desired effect on the viscous resin. At these sufficiently high shear rates (one reference states above $10^6$ Hz), the viscosity of the pseudoplastic resin will revert to Newtonian behavior which will facilitate flow of the resin at pressures that are achievable with conventional autoclaves.

Processing of a laminate containing a high viscosity resin includes (1) laying up prepreg plies by hand or with fiber placement machines in a desired pattern on a layup mandrel, (2) applying a suitable vacuum bag around the plies, and (3) placing the bag in either a specially equipped oven or an autoclave for consolidation. The surrounding atmosphere is pressurized to apply pressure to the vacuum bagged part. The bagging might include a diaphragm chamber that can be pressurized or the entire autoclave can be pressurized, or both approaches can be used. In the present invention, the oven or autoclave is equipped to provide high frequency, low displacement vibration to the part during the heating and pressure application phase of the consolidation cycle to promote resin flow by converting the rheology from pseudoplastic to Newtonian.

Our approach involves installing piezoelectric transducers in the layup mandrel and providing electrical power through an appropriate connection after positioning the tool in a conventional oven or autoclave. The propagation of acoustic waves (i.e., the pressure wave imparted by the transducer at ultrasonic frequencies) through the part involves periodic fluctuations in pressure and displacement. At a high power density, the pressure amplitude can reach or exceed 1000 psi at displacements less than 1 $\mu m$ ($10^{-6}$ m). The ultrasonic vibration aids mass transport of volatiles out of the resin by increasing the probability of nucleation.

Ultrasonic vibration may also aid in the compaction of dry thermoplastic prepreg tape that is being laid with a hot-head automatic tape layer. The vibration may aid-in the local compaction of the material under the tape head when the material is laid down to reduce the pressure requirement during the laying process. A reduced pressure may allow the use of a conformal rubber application head rather than a conventional rigid head.

We can also introduce the ultrasonic energy into a part by placing a cover panel or blanket containing the piezoelectric transducers over the part surface to achieve the necessary conduction path.

DETAILED DESCRIPTION OF A PREFERRED EMBODIMENT

The present invention relates to a method for processing advanced composite thermoplastic resins, like duPont's K3B, to produce fully consolidated (essentially zero porosity) parts using ultrasonic vibration at high frequency and low amplitude to promote flow. The resins of interest exhibit non-Newtonian Theological behavior. Instead of having a generally linear relationship between shear stress and the rate of shear, advanced composite resins typically are non-Newtonian pseudoplastic fluids that are characterized by a decrease in viscosity with an increase in the shear rate. As pseudoplastics, the increase of shear rate, therefore, promotes resin flow. In the present invention, we supplement the Theological properties achievable through the dynamic compression stress and elevated temperatures that we can obtain in conventional autoclave processing by imparting vibration to the part.

Some advanced composite resins require higher processing pressures than autoclaves can achieve, so the ultrasonic vibration augmentation of the present invention is crucial if these resins are to be processed to zero porosity structural aerospace parts. The ultrasonic vibration translates to a dynamic pressure enhancement to the static pressure of the autoclave.

The present invention is useful both for the curing and consolidation of resins and for their injection into resin transfer molding (RTM) tools. Enhancing flow with the increased shear rate allows the resin's solvent to escape and the resin to flow around the reinforcing fiber to achieve full saturation. Enhanced flow allows processing in a narrow processing window in which the solvent boils, the resin melts, and the melted resin cures. The resin must complete flowing before cure progresses to any significant extent because the cure causes the resin to chain-extend to molecules of large molecular weight that have poor flow characteristics.

Figure 1:
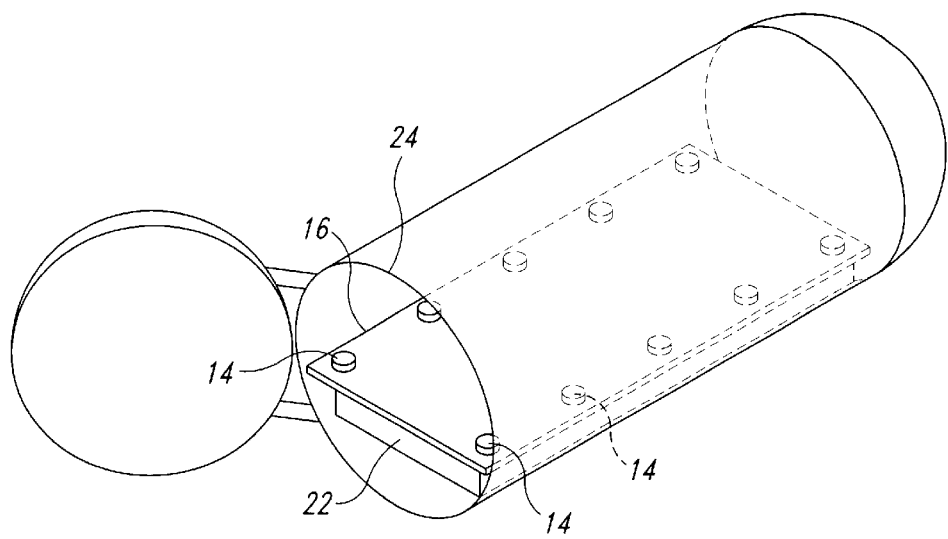
FIG. 1 shows an ultrasonic vibration table of the present invention positioned in an autoclave for receiving a layup mandrel.
Figure 2:
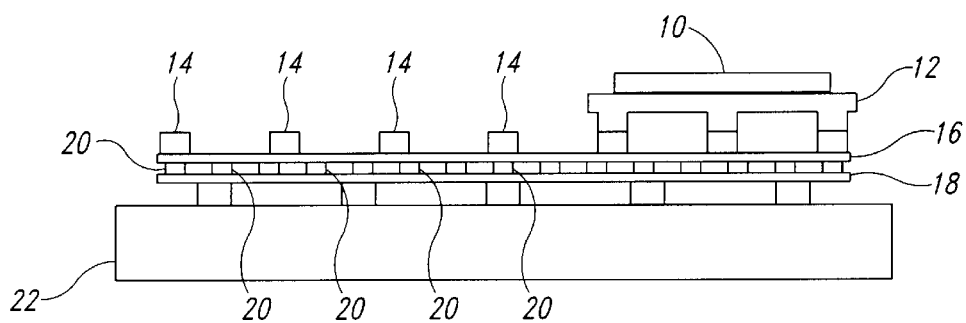
FIG. 2 shows a side elevation of a typical vibration table of the type shown in FIG. 1.

FIGS. 1 and 2 illustrates one preferred embodiment of how we introduce high frequency, low amplitude ultrasonic vibration to prepregs 10. The resin prepregs 10 are laid up on a layup mandrel 12 (FIG. 2) that rests on hard point attachment feet 14 over a pair of metal plates 16 & 18 sandwiching piezoelectric transducers 20. The plates typically are Invar or another metal having a coefficient of thermal expansion comparable to the resin composite. The transducers convert electrical energy to ultrasonic vibration. Suitable transducers should be functional at the elevated autoclave processing temperatures and pressures to input to the part vibrations of at least $10^5$ Hz (and probably at least $10^6$ Hz) with a displacement amplitude of no more than about $10^{-6}$ m. The frequency should exceed the frequency for the resin being processed at which Newtonian Theological behavior appears in the pseudoplastic fluid state of the resin for its melting and curing.

The metal plates 16 & 18 and piezoelectrical transducers 20 form a "shaker table." The shaker table sits on a shock isolation mounting 22 in the autoclave 24.

Figure 3:
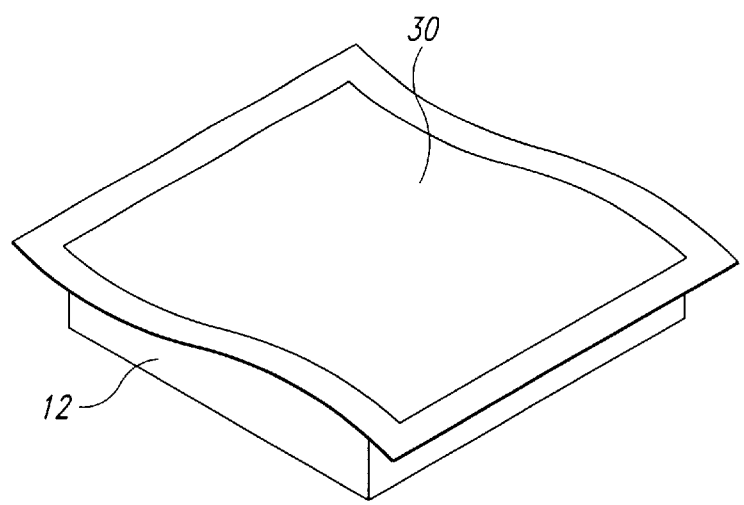
FIG. 3 shows a transducer pad positioned over a layup mandrel.
Figure 4:
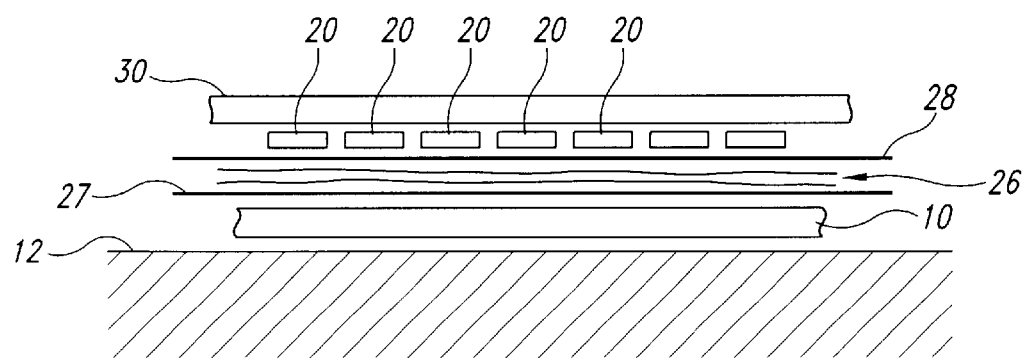
FIG. 4 shows a cross-section of the transducer pad on the layup mandrel.

FIGS. 3 and 4 shows an alternate embodiment for imparting the ultrasonic vibrational energy as an acoustic wave to the resin. Here, a transducer pad or cover panel 30 overlies the resin on the layup mandrel 12. A breather 26, release film 27, and vacuum bag 28 (FIG. 4) separate the transducer pad 30 from the part 10. The transducer pad is shaped to correspond to the configuration of the completed part and acts as a caul plate for the autoclave pressure.

For RTM processing, the transducers act on the rigid tool surfaces.

Power requirements are difficult to calculate because damping effects are difficult to model. Similarly, the correlation between power density or intensity as a function of displacement and frequency are not completely understood. Nevertheless, at $10^5$ Hz and $10^{-6}$ m displacement, a typical power requirement is on the order of 15,000 W/m$^2$. Accordingly, large parts will require significant energy.

Cure and consolidation of a viscous thermoplastic resin, especially one that softens and melts at a high temperature, is improved by assisting autoclave pressurized momentum transport for compaction of the composite using high frequency, low amplitude acoustic vibration within the resin. The vibration induces shear thinning in the resin which promotes resin flow, achieves filling or collapse of voids, and assists consolidation of the composite preform.

While we have described preferred embodiments, those skilled in the art will readily recognize alterations, variations, and modifications which might be made without departing from the inventive concept. Therefore, interpret the claims liberally with the support of the full range of equivalents known to those of ordinary skill based upon this description. The examples are given to illustrate the invention and not intended to limit it. Accordingly, limit the claims only as necessary in view of the pertinent prior art.

We claim:

1. A method for curing a viscous thermoplastic resin preform having significant residual volatiles, comprising the steps of:
   a) preparing a fiber-reinforced resin perform;
   b) enclosing the preform in a pressure zone;
   c) applying a suction to reduce the pressure below one ambient atmosphere in the pressure zone to extract residual volatiles and condensation by-products during curing;
   d) then, compacting the preform;
   e) then, heating the preform to a curing temperature of the resin while inputting acoustic vibration into the preform at a vibration frequency to assist momentum transport of the resin for adequate flow to fill voids and to assist in consolidating the preform as the resin melts and cures at the curing temperature to a composite.

2. The method of claim 1 wherein the heating step occurs in an autoclave and wherein the acoustic vibration is input into the preform using transducers that act through a layup mandrel which supports the preform.

3. The method of claim 1 wherein the acoustic vibration is input at a frequency of about $10^5$ Hz or greater with a displacement amplitude of about $10^{-6}$ m.

4. The method of claim 3 wherein the vibration frequency induces Newtonian Theological behavior in a pseudoplastic fluid state of the resin as the resin melts and cures.

5. The method of claim 3 the melted resin has a viscosity greater than $10^6$ Pa-sec.

6. The method of claim 1 wherein step (e) results in the composite being substantially free of porosity and free from microcracking because the residual volatiles and the condensation by-products generated during curing escape from the preform.

7. The method of claim 1 further comprising the step of controlling displacement of the fibers in the resin preform to avoid distortion of the fibers in the composite.

8. The method of claim 1 wherein the resin is a thermoplastic that exhibits non-Newtonian rheological behavior.

9. The method of claim 8 wherein the resin is pseudoplastic so that the viscosity of the resin decreases with an increase in shear rate.

10. The method of claim 9 wherein step (e) results in the composite being substantially free of porosity and free from microcracking because the residual volatiles and the condensation by-products generated during curing escape from the preform.

* * * * *